United States Patent
Ryczek

(10) Patent No.: US 11,660,619 B2
(45) Date of Patent: May 30, 2023

(54) ADJUSTABLE SWIVEL

(71) Applicant: Tyco Fire Products LP, Lansdale, PA (US)

(72) Inventor: Chad Lee Ryczek, Oconto Falls, WI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

(21) Appl. No.: 16/212,276

(22) Filed: Dec. 6, 2018

(65) Prior Publication Data

US 2019/0176168 A1 Jun. 13, 2019

Related U.S. Application Data

(60) Provisional application No. 62/595,688, filed on Dec. 7, 2017, provisional application No. 62/595,701, filed on Dec. 7, 2017.

(51) Int. Cl.
*F16L 27/02* (2006.01)
*F16L 27/047* (2006.01)
(Continued)

(52) U.S. Cl.
CPC .............. *B05B 1/00* (2013.01); *B05B 15/654* (2018.02); *F16L 27/023* (2013.01); *F16L 27/047* (2013.01)

(58) Field of Classification Search
CPC ........ B05B 1/00; B05B 15/654; F16L 27/023; F16L 27/047; F16L 27/0849;
(Continued)

(56) References Cited

U.S. PATENT DOCUMENTS

| 1,067,642 A | 7/1913 | Byam |
| 3,361,450 A | 1/1968 | Franck |

(Continued)

FOREIGN PATENT DOCUMENTS

| CN | 2122996 U | 11/1992 |
| DE | 20 2012 002 799 U1 | 5/2013 |

(Continued)

OTHER PUBLICATIONS

International Search Report and Written Opinion Received for International Application No. PCT/US2018/064283 dated Feb. 21, 2019, 16 pages.

*Primary Examiner* — Jason J Boeckmann
(74) *Attorney, Agent, or Firm* — Foley & Lardner LLP

(57) ABSTRACT

An adjustable nozzle assembly includes a receiver having a fluid inlet configured to be fluidly coupled to a fluid source and an internal surface defining a reception chamber fluidly coupled to the fluid inlet, a swivel member disposed in the reception chamber of the receiver, a nozzle coupled to the swivel member, fluidly coupled to the reception chamber, and configured to discharge fluid along a discharge axis, and a restriction member coupled to the receiver such that the swivel member is positioned between the receiver and the restriction member. The swivel member has an external surface including a substantially spherical external surface portion in contact with the internal surface of the receiver. The restriction member has a surface geometry defining a passageway through which the nozzle extends, and the surface geometry limits rotation of the swivel member within the receiver.

20 Claims, 5 Drawing Sheets

(51) Int. Cl.
    *B05B 15/654*    (2018.01)
    *B05B 1/00*    (2006.01)
(58) Field of Classification Search
    CPC ......... F16L 27/0853; F16L 27/08; F16K 5/06;
                                                F16K 5/0605
    USPC .......................................... 239/587.3, 587.4
    See application file for complete search history.

(56) References Cited

U.S. PATENT DOCUMENTS

| | | | | |
|---|---|---|---|---|
| 3,605,735 | A * | 9/1971 | Soden | A61H 33/027 |
| | | | | 601/169 |
| 6,454,313 | B1 * | 9/2002 | Dawson, Jr. | F16L 27/047 |
| | | | | 285/261 |
| 6,846,022 | B2 * | 1/2005 | Takagi | F16L 27/023 |
| | | | | 285/146.1 |
| 2002/0062872 | A1 * | 5/2002 | Makishima | F16L 37/47 |
| | | | | 137/616.7 |
| 2005/0140138 | A1 * | 6/2005 | Byerly | F16L 27/047 |
| | | | | 285/260 |
| 2015/0308597 | A1 | 10/2015 | Lillmars | |

FOREIGN PATENT DOCUMENTS

| | | |
|---|---|---|
| JP | 2004-028310 A | 1/2004 |
| WO | WO-2013/146989 A1 | 10/2013 |

* cited by examiner

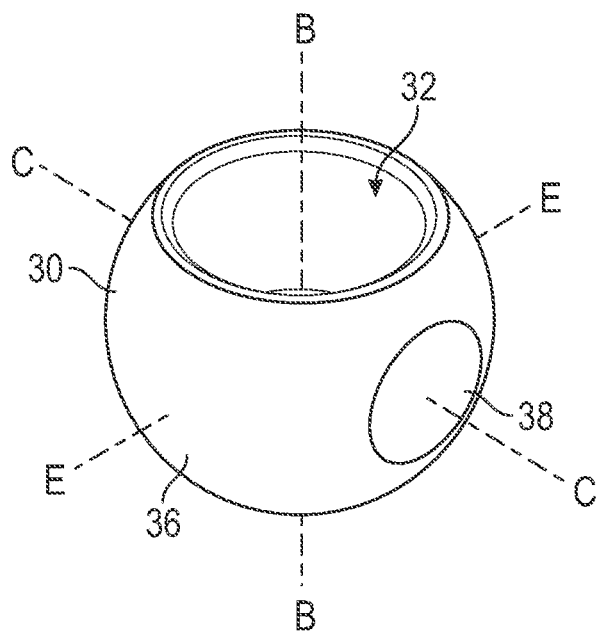
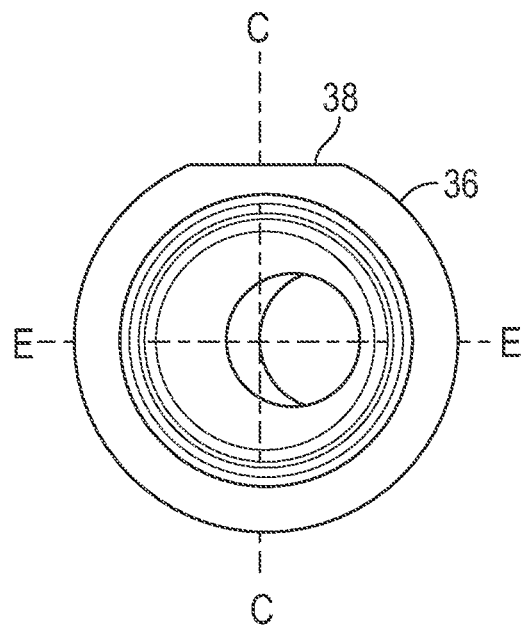
FIG. 4A
FIG. 4B
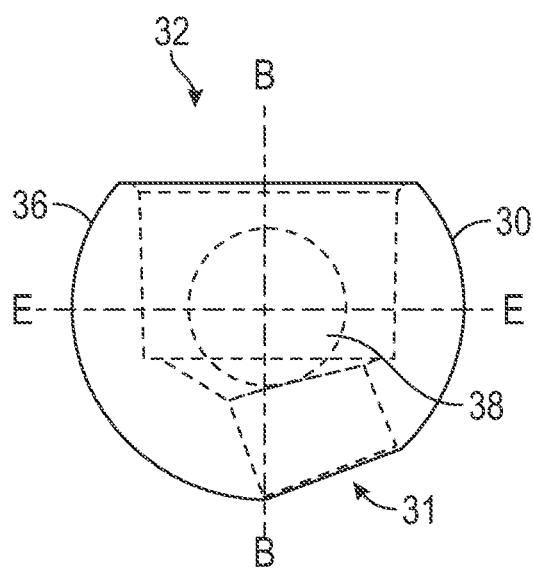
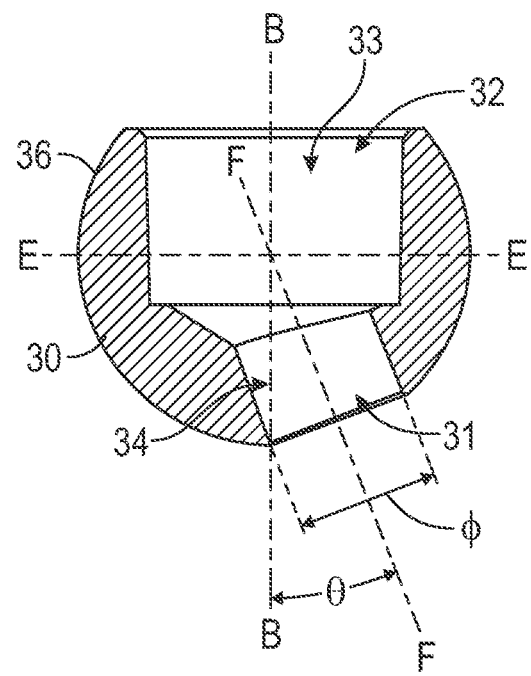
FIG. 4C
FIG. 4D

… (1)

ADJUSTABLE SWIVEL

CROSS-REFERENCE TO RELATED PATENT APPLICATIONS

This application claims priority to and the benefit of U.S. Provisional Patent Application No. 62/595,701, filed Dec. 7, 2017, and U.S. Provisional Patent Application No. 62/595,688, filed Dec. 7, 2017, both of which are incorporated herein by reference in their entireties.

BACKGROUND

The present disclosure relates generally to connection fittings for fluid flow devices. More specifically, the present disclosure relates to a fluid nozzle assembly having an adjustable swivel fitting.

Vehicle fire suppression systems are used across various markets such as, for example, mining, forestry, waste management, farming, and transit. Dry and wet chemical based systems are installed using a network of fire protection nozzles to deliver a fire fighting agent to hazard areas. These known nozzles have a specific spray pattern to cover the hazard area. The nozzles are installed with the use of brackets on flat surfaces. A nozzle is typically installed using multiple pipe elbows to properly orient the nozzle and aim its spray in a desired manner into the hazard area. Using multiple elbows and fittings can increase the complexity and cost of a nozzle installation. Swivel-type nozzle adapters are available to help achieve proper aiming, but many of these known adapters have drawbacks such as, for example, a limited angle of articulation of 15° from the vertical axis to the surface flat (30° inclusively about the vertical axis).

SUMMARY

At least one embodiment relates to an adjustable nozzle assembly including a receiver having a fluid inlet configured to be fluidly coupled to a fluid source and an internal surface defining a reception chamber fluidly coupled to the fluid inlet, a swivel member disposed in the reception chamber of the receiver, a nozzle coupled to the swivel member, fluidly coupled to the reception chamber, and configured to discharge fluid along a discharge axis, and a restriction member coupled to the receiver such that the swivel member is positioned between the receiver and the restriction member. The swivel member has an external surface including a substantially spherical external surface portion in contact with the internal surface of the receiver. The restriction member has a surface geometry defining a passageway through which the nozzle extends, and the surface geometry limits rotation of the swivel member within the receiver.

Another embodiment relates to an adjustable nozzle assembly including a receiver, a swivel member disposed in the reception chamber of the receiver, a nozzle coupled to the swivel member, and a restriction member. The receiver has a first inlet, a first outlet, and a first internal passageway extending between the first inlet and the first outlet. The receiver includes the reception chamber centered about a first axis and in fluid communication with the first internal passageway. The swivel member has a second inlet fluidly coupled to the first outlet, a second outlet, and a second internal passageway extending between the second inlet and the second outlet. The nozzle is fluidly coupled to the second internal passageway and centered about a second axis. The restriction member has an internal surface configured to engage an external surface of the swivel member to permit rotation of the swivel member relative to the restriction member about only a third axis that intersects and is perpendicular to the first axis.

Another embodiment relates to a method of swivel adjustment for a nozzle including (a) providing a main body defining a first internal passageway configured to be fluidly coupled to a fluid source, the main body defining a reception chamber fluidly coupled to the first internal passageway, (b) providing a swivel member within the reception chamber such that a second internal passageway of the swivel member is fluidly coupled to the first internal passageway, where the swivel member is configured to rotate with respect to the main body, (c) providing a nozzle coupled to the swivel member and fluidly coupled to the second internal passageway, (d) adjusting an orientation of the swivel member, and (e) selectively securing the swivel member in a desired orientation. The swivel member is adjustable through at least 360 degrees about one axis and through a total inclusive angle of articulation of up to 100 degrees with respect to the one axis.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 4A is a rear perspective view of a swivel member of the adjustable connection fitting of FIG. 2.

FIG. 4B is a top view of the swivel member of FIG. 4A.

FIG. 4C is a front view of the swivel member of FIG. 4A.

FIG. 4D is front cross-sectional view of the swivel member of FIG. 4A.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, an adjustable nozzle assembly includes a connection fitting having a swivel-type adjustability of a fluid distribution device or nozzle. The connection fitting orientates or angles the nozzle by a maximum included angle of up to 50° (100° inclusive) with respect to a normal axis, axis of the fitting, or axis of incoming fluid flow. This fitting may be used for connecting a nozzle or other type of fluid distribution device to pipes, hoses, and/or installation brackets.

The connection fitting includes a receiver having a first inlet, a first outlet and a first internal passageway extending between the first inlet and the first outlet. The receiver further includes an internal surface defining a reception chamber centered about a first axis and in fluid communication with the first inlet. A swivel member is disposed in the first reception chamber of the receiver. The swivel member has a second inlet, a second outlet and a second internal passageway extending between the second inlet and the second outlet. The swivel member includes a connection port centered about a second axis and configured to receive the fluid distribution device. The connection port is downstream of the second outlet and in fluid communication with the second internal passageway. The swivel member has a substantially spherical external surface in line contact with the internal surface of the receiver. The internal surface defines three degrees of rotation of the swivel member with respect to the receiver. A nozzle having an inlet portion and a discharge portion is disposed in the connection port of the swivel member with the discharge portion of the nozzle extending from the swivel member. The discharge portion provides for rotation of the swivel member within the receiver.

A restriction member is secured and engaged with the receiver to house the swivel member therebetween. The restriction member includes a first open end, a second open end and an internal surface defining a passageway extending from the first open end to the second open end. The discharge portion of the nozzle extends through the second open end of the restriction member to limit rotation of the swivel member within the receiver. The assembly includes a securement member engaged with the receiver to secure the restriction member to the receiver and form a fluid tight path from the first inlet through the first and second internal passageways and the inlet portion of the nozzle.

Figure 1:
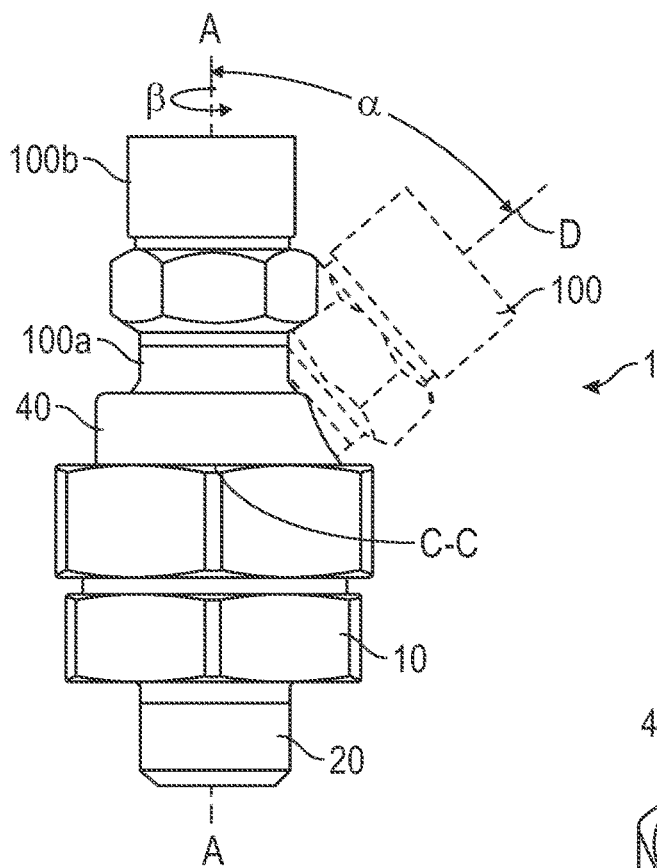
FIG. 1 is a front view of an adjustable fluid distribution assembly with a fluid distribution device in an initial home position and an adjusted angular position, according to an exemplary embodiment.
Figure 2A:
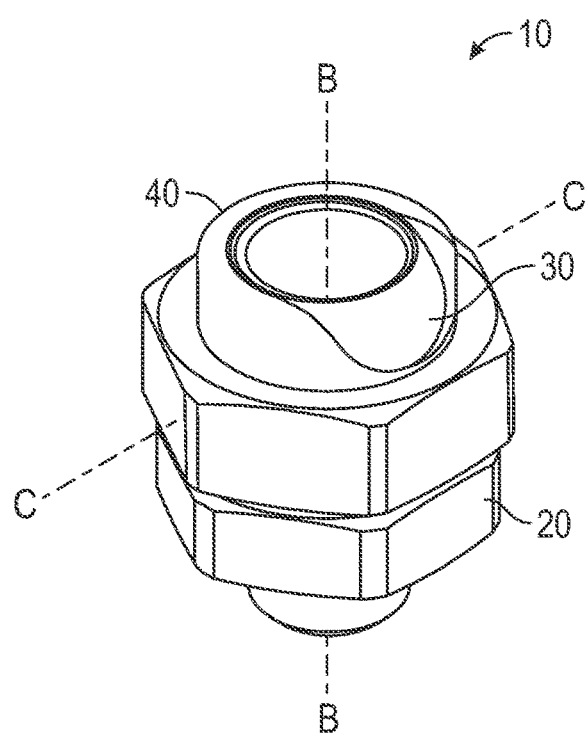
FIG. 2A is a front perspective view of an adjustable connection fitting of the adjustable fluid distribution assembly of FIG. 1.
Figure 2B:
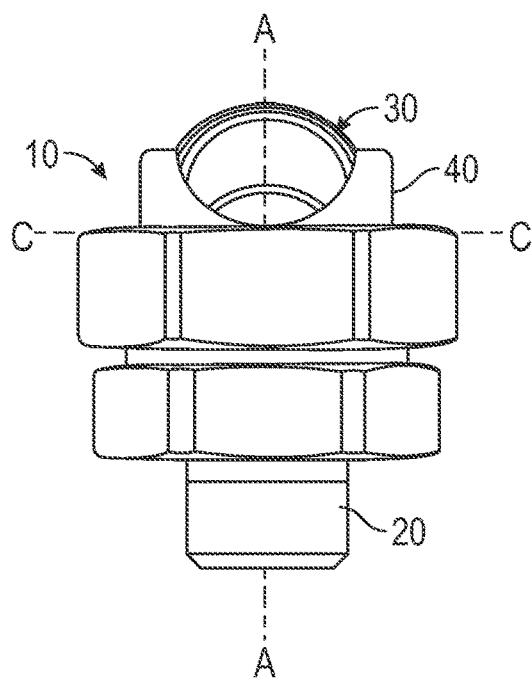
FIG. 2B is a right side view of the adjustable connection fitting of FIG. 2.

Referring to FIG. 1, an adjustable fluid distribution assembly or adjustable nozzle assembly, shown as assembly 1, includes an adjustable swivel, swivel fitting, or adjustable fitting, shown as connection fitting 10, and a fluid distribution device or fluid flow device (e.g., nozzle, mister, orifice, etc.), shown as nozzle 100. The connection fitting 10 fluidly couples (e.g., connects) the nozzle 100 to a fluid source (e.g., a pump, a reservoir, a pressurized tank, etc.) and provides for swivel adjustability to install and aim the nozzle 100 and direct its fluid discharge. The connection fitting 10, as shown in FIGS. 2A and 2B without the nozzle 100, includes a main body, base, or receiver member, shown as receiver 20, that is fluidly coupled to the fluid source and a ball-shaped or spherical member, shown as swivel member 30, disposed at least partially in (e.g., received by) the receiver 20. The nozzle 100 is inserted into a connection port of the swivel member 30. The swivel member 30 is rotatable within the receiver 20 to permit the position of the nozzle 100 to be angularly adjusted. A collar, shown as restriction member 40, is engaged with and coupled to the receiver 20 to form a fluid tight housing about the swivel member 30 that places the nozzle 100 in fluid communication with the fluid source. The restriction member 40 may also facilitate the angular adjustment of the swivel member 30 and the nozzle 100 over an angular range that is greater than other fittings.

FIG. 1 illustrates the adjustability of the assembly 1 in which the installed fluid distribution device is embodied as a nozzle 100. As shown, the connection fitting 10 and its receiver 20 are centered about a first axis A-A (e.g., a central axis, a fitting axis, etc.). The nozzle 100 includes an inlet portion 100a that is directly coupled to (e.g., connects to) the connection fitting 10 to receive the supplied fluid and a discharge portion 100b that extends outward from the connection fitting 10 to determine the direction of fluid discharge about a discharge axis D-D. The nozzle 100 is shown in solid in a first home position in which the discharge portion 100b is axially aligned with the central axis A-A of the connection fitting 10. To show the adjustability of the connection fitting 10, the nozzle 100 is also shown in phantom to illustrate its bend angle $\alpha$ from the fitting axis A-A and its initial home position. The bend angle $\alpha$ defines the range of angular adjustment for the nozzle 100 over which the discharge axis D-D may be aimed relative to the fitting axis A-A. When this bend angle $\alpha$ is at its maximum (e.g., due to a physical limit caused by contact between two components), the bend angle $\alpha$ is at a maximum bend angle $\alpha$MAX. In some embodiments, the maximum bend angle $\alpha$MAX is greater than fifteen degrees and less than ninety degrees. In some such embodiments, the maximum bend angle $\alpha$MAX ranges from greater than thirty degrees to less than sixty degrees. In some such embodiments, the maximum bend angle $\alpha$MAX is fifty degrees. In another aspect of the connection fitting 10, the connection fitting 10 permits the nozzle 100 to rotate about the fitting axis A-A through a rotation angle $\beta$. In some embodiments, the connection fitting 10 provides for a maximum rotation angle $\beta$ of at least 360 degrees (e.g., unconstrained, infinite rotation about the fitting axis A-A, etc.). Accordingly, with the ability to locate the nozzle 100 at diametrically opposed positions about the fitting axis A-A, the connection fitting 10 can define a total inclusive angle of articulation $\alpha$TOTAL of the nozzle 100 about the axis A-A of at least ninety degrees (90°) and up to one hundred degrees (100°). As such, in some embodiments, the total inclusive angle of articulation $\alpha$TOTAL is twice the maximum bend angle $\alpha$MAX. Thus, the connection fitting 10 provides for angular adjustment that is greater than other swivel-type connection fittings. Alternatively, rotation of the nozzle may be otherwise limited. By way of example, the receiver 20 and the restriction member 40 may include corresponding protrusions that engage one another to limit the maximum rotation angle $\beta$ to less than 360 degrees.

In other embodiments, the nozzle 100 is replaced with another type of fluid distribution device or fluid flow device configured to receive or provide fluid (e.g., a conduit such as a hose or pipe, an accumulator, a filter, a valve, an orifice positioned in series with a conduit, etc.). By way of example, the connection fitting 10 may be used to fluidly couple two conduits (e.g., hoses, pipes, etc.). Such a configuration may be useful in situations where it is desirable for the two fluid flow devices to be angled relative to one another (e.g., to extend around an obstacle, to redirect out of a corner, etc.). Such a configuration may also be useful in situations where the relative angle between the two conduits may require adjustment (e.g., one, occasionally, frequently, etc.). By way of example, the relative angle between two pipes may be adjusted to facilitate coupling one of the pipes to a different fluid source or outlet. Depending upon the configuration of the assembly 1 (e.g., which types of components that the connection fitting 10 is fluidly coupling), fluid may flow through the connection fitting 10 in either direction (e.g., in through the receiver 20 and out through the swivel member 30 or in through the swivel member 30 and out through the receiver 20).

Figure 3:
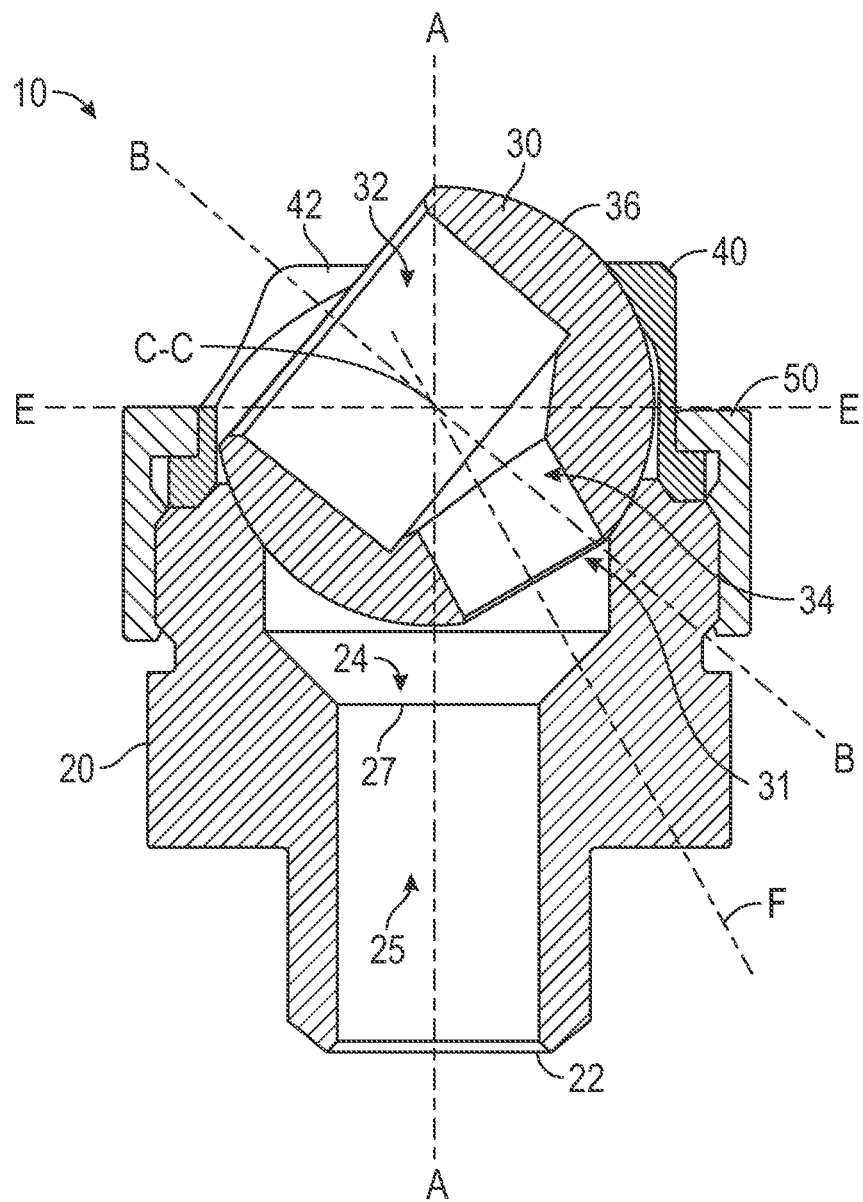
FIG. 3 is a rear cross-sectional view of the adjustable connection fitting of FIG. 2.

Shown in FIG. 3 is a cross-sectional view of the connection fitting 10 showing its components and their internal features. The receiver 20 includes an aperture or fluid inlet connection, shown as fluid inlet 22, and an internal volume, shown as reception chamber 24, fluidly coupled to (e.g., in fluid connection with) the fluid inlet 22. Each of the fluid inlet 22 and the reception chamber 24 may be centered about the fitting axis A-A and aligned with one another along the fitting axis A-A. The swivel member 30 is disposed in the reception chamber 24 of the receiver 20 and includes an aperture, shown as connection port 32, for receipt of the nozzle 100 and a conduit, fluid flow passage, or fluid passage, shown as internal passageway 34, through which the supplied fluid flows from the receiver 20 to the nozzle 100. The swivel member 30 has an external surface 36 that, when unrestricted, defines three degrees of rotation within the receiver 20, which means that it can freely swivel or rotate with respect to the receiver 20 within the reception chamber 24. The connection port 32 is centered about and extends along a central axis B-B (e.g., a connection port axis) of the swivel member 30. In some embodiments, the central axis B-B is coaxial with the discharge axis D-D. The central axis B-B angulates and rotates with respect to the fitting axis A-A as the swivel member 30 rotates. The restriction member 40 can be secured to the receiver 20 by a separate retainer (e.g., nut, collar, etc.), shown as securement member 50. In some embodiments, the securement member 50 is an internally threaded member that receives the restriction member 40 and selectively couples to the restriction member 40 through a threaded engagement. The securement member 50 permits the restriction member 40 and the swivel member 30 to rotate as described herein. The restriction member 40 has a surface geometry defining a passageway through which the nozzle 100 can extend and which restricts rotation of the swivel member 30 and the nozzle 100 within the receiver 20 while maintaining a fluid tight flow path from the fluid inlet 22 to the nozzle 100. Although the assembly 1 is shown with a separate securement member 50, it should be understood that the restriction member 40 could independently secure itself to the receiver 20 provided the components can rotate and a fluid tight connection can be formed as described herein.

Referring to FIGS. 4A-4D, the swivel member 30 is shown according to an exemplary embodiment. The swivel member 30 has a first aperture, shown as inlet 31, a second aperture, shown as outlet 33, and the internal passageway 34 extending between the inlet 31 and the outlet 33. In some embodiments, contiguous with the internal passageway 34 is the connection port 32 for downstream fluid communication and which provides a reception chamber centered about central axis B-B for the nozzle 100 or other fluid distribution device to be inserted. In some embodiments, the internal surface of the swivel member 30 that circumscribes the central axis to form the connection port 32, includes a fastening formation such as, for example, an internal thread for threaded engagement with the nozzle 100, coupling the nozzle 100 to the swivel member 30. The swivel member 30 has an external surface 36 that defines three degrees of freedom or rotation with respect to the receiver 20 when unrestricted, for rotation about any one of the intersecting and orthogonal axes B-B, C-C, and E-E. In this embodiment, the external surface 36 of the swivel member 30 is substantially spherical, and more particularly, over 50% of the external surface 36 of the swivel member 30 is spherical about a common center point which facilitates rotation of the swivel member in the receiver 20. In some embodiments, the external surface 36 also includes a flat or planar portion 38 (e.g., a circular planar portion) that interacts with (e.g., engages) the restriction member 40 to restrain the rotational freedom of the swivel member in the assembly 1.

Shown in FIGS. 5A-5E are views of a preferred embodiment of the restriction member 40. The restriction member 40 has a first open end 42, a second open end 44 and an internal surface 46 defining a passageway 48 extending from the first open end 42 to the second open end 44. The first open end 42 of the restriction member 40 engages the receiver 20 so as to form a housing for the swivel member 30 in the assembly 1 (e.g., the housing defining an internal volume including the passageway 48 and the reception chamber 24). The second open end 44 is configured to permit the discharge portion 100b of the nozzle 100 or other fluid distribution device to extend therethrough. The second open end 44 and/or the internal surface 46 define a geometry that restricts the rotation of the swivel member 30 to provide for a specific articulation and adjustability of the nozzle 100 in the assembly 1.

Figure 5A:
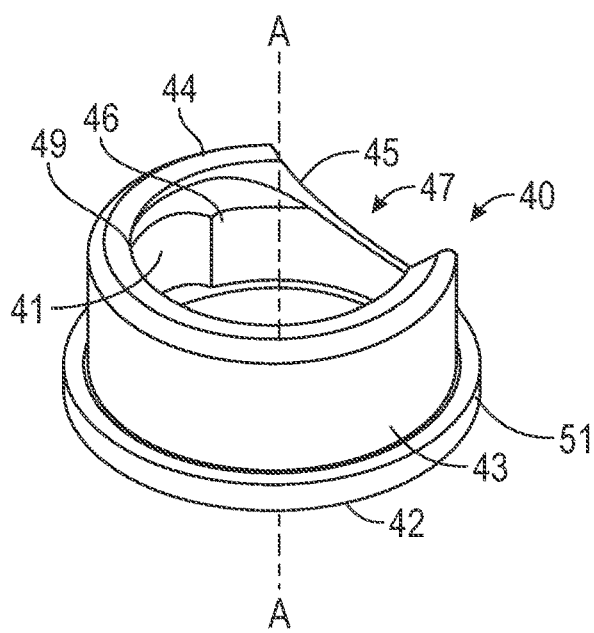
FIG. 5A is a front perspective view of a restriction member of the adjustable connection fitting of FIG. 2.
Figure 5B:
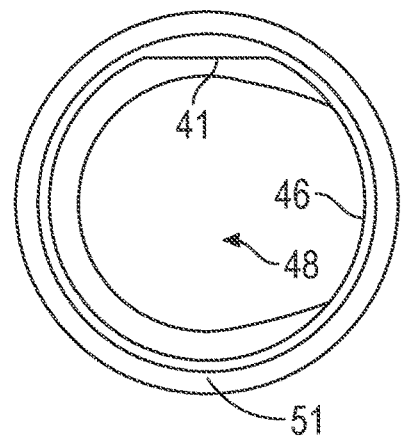
FIG. 5B is a bottom view of the restriction member of FIG. 5A.
Figure 5C:
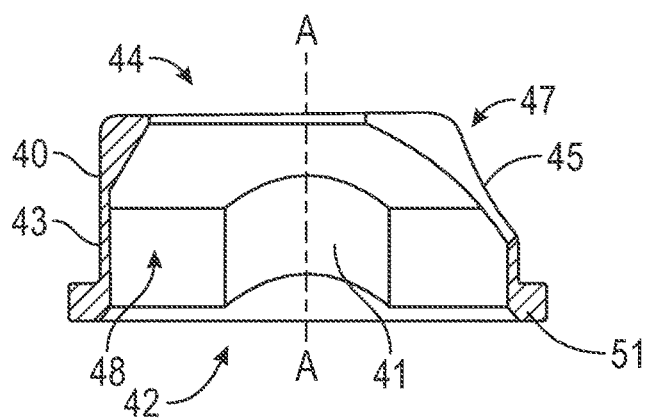
FIG. 5C is a front cross-sectional view of the restriction member of FIG. 5A.
Figure 5D:
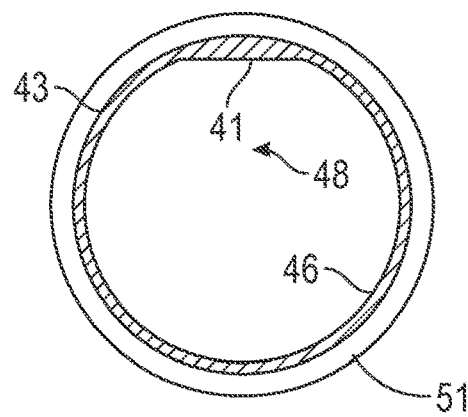
FIG. 5D is a top cross-sectional view of the restriction member of FIG. 5A.
Figure 5E:
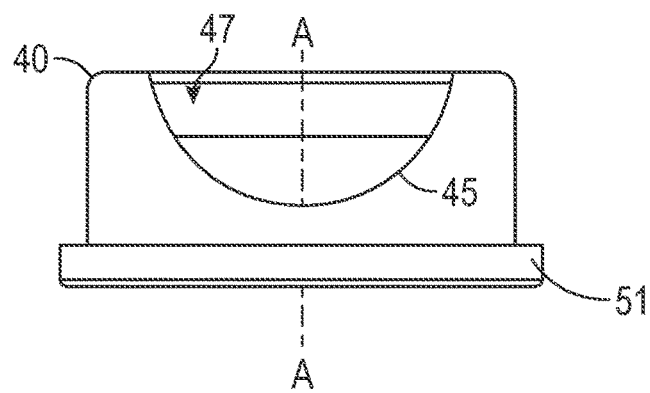
FIG. 5E is a right side view of the restriction member of FIG. 5A.

As seen in FIGS. 5B and 5D, the internal surface 46 of the restriction member 40 includes a flat or planar portion 41 for mating with the planar portion 38 of the external surface 36 of the restriction member 40. With the planar portion 38 and the planar portion 41 mated, the restriction member 40 rotates with the swivel member 30. Specifically, the swivel member 30 is permitted to rotate relative to the restriction member 40 about the axis C-C, but the swivel member 30 is prevented from rotating relative to the restriction member 40 about the axis B-B or the axis E-E. In other embodiments, the internal surface 46 and/or the external surface 36 are otherwise shaped to limit rotation of the swivel member 30 relative to the restriction member 40. By way of example, the internal surface 46 and the external surface 36 may have corresponding cylindrical curvatures.

Moreover, with the restriction member 40 secured to the receiver 20, the swivel member is restricted in one aspect to axial rotation through the angle of rotation 3 about the fitting axis A-A in a manner as previously described. Extending between the first open end 42 and the second open end 44 of the restriction member 40 is a peripheral wall 43. The peripheral wall 43 is annular in some embodiments. The peripheral wall 43 includes an edge formation 45 defining a channel or slot, shown as void 47, that is contiguous with the second open end 44. The void 47 facilitates rotation of the swivel member 30 about the axis B-B through the maximum included angle αMAX between the fitting axis A-A and the inlet portion 100a of the nozzle 100 and its axis D-D in a manner as previously described. In some embodiments, the edge formation 45 is semi-circular to act as a limit to mate with the periphery of the inlet portion 100a of the nozzle 100 at its maximum angulation. At the second open end 44 of the restriction member 40 and opposite the edge formation 45, a peripheral edge formation 49 partially circumscribes the fitting axis A-A. When the nozzle 100 is aligned with fitting axis A-A, the inlet portion 100a engages the peripheral edge formation 49 defining the home position of the nozzle 100 as shown in FIG. 1.

Figure 6A:
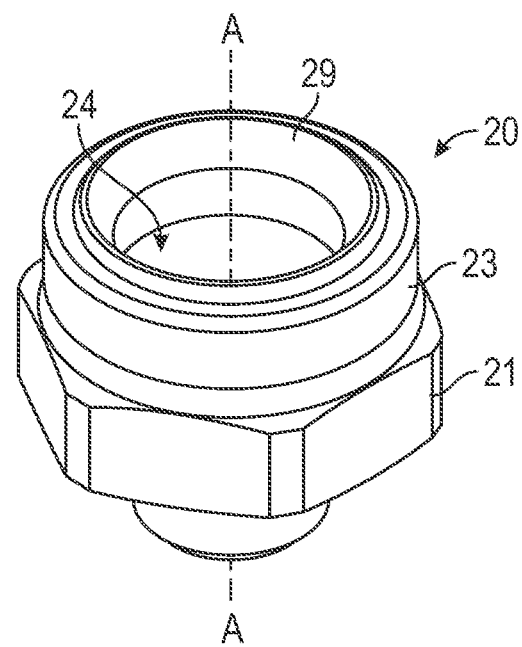
FIG. 6A is a front perspective view of a receiver of the adjustable connection fitting of FIG. 2.
Figure 6B:
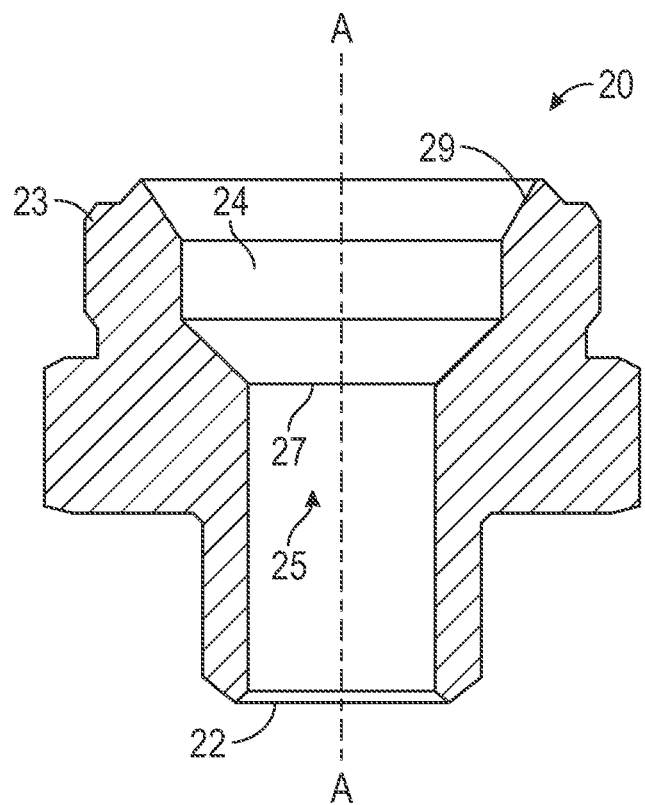
FIG. 6B is a front cross-sectional view of the receiver of FIG. 6A.

Referring to FIGS. 6A and 6B, the receiver 20 is shown according to an exemplary embodiment. The receiver 20 is a generally tubular body. In some embodiments, an outer surface of the receiver 20 includes a tool engagement surface 21 (e.g., a hexagonal surface configured to engage a wrench) and a complimentary external feature 23 for engagement with the securement member 50. In some embodiments, the external feature 23 is an external thread configured for engagement with the securement member 50 to selectively couple the securement member, the restriction member 40, the swivel member 30, and the nozzle 100 to the receiver 20. Specifically, the securement member 50 is configured to engage a flange or shoulder, shown as flange 51, of the restriction member 40 to limit movement of the restriction member 40 along the axis A-A relative to the receiver 20. The internal surface 46 and/or the internal surface 29 engage the external surface 36, limiting (e.g., preventing) translational movement of the swivel member 30 relative to the restriction member 40 and the receiver 20. To decouple the swivel member 30, the restriction member 40, and the securement member 50 from the receiver 20, the securement member 50 may be loosened and removed.

At the fluid inlet 22, the receiver 20 is externally configured for connection to a fluid flow device or fluid distribution device through a pipe fitting such as a hose connection, union, tee, elbow fitting or other fluid supply bracket or piping. By way of example, the receiver 20 can include a thread or a taper in order to fasten to the supply fitting. Internally, the fluid inlet 22 is fluidly coupled to an internal passageway 25 which terminates at the internal outlet 27, fluidly coupling the reception chamber 24 with the internal passageway 25 for supplying fluid to the swivel member 30 disposed therein. The internal surface 29 of the receiver 20, which defines the reception chamber 24, is configured to permit the swivel member 30 to rotate therein. In some embodiments, the internal surface 29 includes one or more angled surfaces and/or one or more circular edges circumscribed about the fitting axis A-A to form a line contact with the external surface 36 of the swivel member 30 that facilitates rotation. When the swivel member 30 has be adjusted to the desired orientation, the securement member 50 may be tightened, applying a force on the flange 51 along the axis A-A to force the restriction member 40 toward the receiver 20. This forces the internal surface 29 of the receiver 20 and the internal surface 46 of the restriction member 40 against the external surface 36 of the swivel member 30, frictionally fixedly coupling the receiver 20, the swivel member 30, the restriction member 40, and the securement member 50 to one another. The securement member 50 may be loosened to again adjust the orientation of the swivel member 30.

Referring to FIGS. 3 and 4D, as the swivel member 30 rotates to provide for the desired adjustability of the nozzle 100 or other fluid distribution device described herein, the internal passageway 34 of the swivel member 30 remains in fluid communication with the internal passageway 25 of the receiver 20 so as to ensure an operable flow and pressure of fluid to the nozzle 100. The inlet 31 is positioned within the swivel member 30 such that the cross-sectional area of the inlet 31 through which fluid flows to the nozzle 100 remains the same regardless of the adjusted angulation between the connection port 32 and the fitting axis A-A. Moreover, to ensure that fluid supply to the nozzle 100 or other fluid distribution device remains uninterrupted, an axis F-F, along which the internal passageway 34 of the swivel member 30 extends, is skewed at a skew angle θ with respect to the central axis B-B of the swivel member 30 so that regardless of the rotational adjustment of the swivel member 30, the internal passageway 34 remains unobstructed for receipt of incoming fluid flow. In one embodiment where the assembly 1 provides for a maximum bend angle αMAX of fifty degrees, the skew angle θ of the internal passageway 34 of the swivel member 30 is twenty degrees, as seen in FIG. 4D.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the adjustable nozzle assembly as shown in the various exemplary embodiments is illustrative only. Additionally, any element disclosed in one embodiment may be incorporated or utilized with any other embodiment disclosed herein. For example, the cylindrical curvature of the external surface 36 described in at least paragraph [0033] may be utilized with the corresponding protrusions of the exemplary embodiment described in at least paragraph [0028]. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An adjustable nozzle assembly comprising:
   a receiver having a first inlet, a first outlet, and a first internal passageway extending between the first inlet and the first outlet, the receiver including a reception chamber centered about a first axis, the reception chamber being in fluid communication with the first internal passageway;
   a swivel member disposed in the reception chamber of the receiver, the swivel member having a second inlet fluidly coupled to the first outlet, a second outlet, and a second internal passageway extending between the second inlet and the second outlet;
   a nozzle coupled to the swivel member and fluidly coupled to the second internal passageway, wherein the nozzle is centered about a second axis;
   a restriction member formed as a single continuous piece having an internal surface including a first planar portion configured to engage a second planar portion of an external surface of the swivel member to limit rotation of the swivel member relative to the restriction member; and
   a securement member defining an aperture that receives the restriction member and coupling the restriction member to the receiver, wherein the securement member is directly coupled to the receiver and configured to selectively force the restriction member toward the receiver, and wherein the securement member is movable relative to the restriction member.

2. The adjustable nozzle assembly of claim 1, wherein the securement member is configured to limit rotation of the restriction member to rotation about the first axis.

3. The adjustable nozzle assembly of claim 2, wherein the swivel member is configured to rotate about the first axis through a maximum rotation angle of at least 360 degrees with respect to the receiver.

4. The adjustable nozzle assembly of claim 3, wherein a bend angle is defined between the first axis and second axis, wherein the bend angle is adjustable from zero degrees to a maximum bend angle, and wherein the maximum bend angle ranges from greater than thirty degrees to less than sixty degrees.

5. The adjustable nozzle assembly of claim 2, wherein the securement member is configured to selectively fixedly couple the restriction member and the swivel member to the receiver.

6. The adjustable nozzle assembly of claim 1, wherein the second internal passageway of the swivel member is centered about and extends along a fourth axis that is skewed with respect to the second axis of the nozzle.

7. The adjustable nozzle assembly of claim 1, wherein the swivel member has a substantially spherical external surface portion in contact with an internal surface of the receiver;
   wherein the nozzle is configured to discharge fluid along the second axis; and
   wherein the restriction member is coupled to the receiver such that the swivel member is positioned between the receiver and the restriction member, and wherein the restriction member defines a passageway through which the nozzle extends.

8. The adjustable nozzle assembly of claim 7, wherein the restriction member is configured to rotate relative to the receiver about the first axis.

9. The adjustable nozzle assembly of claim 7, wherein the second internal passageway of the swivel member is skewed with respect to the second axis of the nozzle.

10. The adjustable nozzle assembly of claim 9, wherein when the second axis of the nozzle is aligned with the first axis, the second inlet of the second internal passageway of the swivel member defines a first cross-sectional area through which fluid can flow, and wherein when the second axis is skewed with respect to the first axis, the second inlet of the second internal passageway of the swivel member defines a second cross-sectional area through which fluid can flow that is the same as the first cross-sectional area.

11. The adjustable nozzle assembly of claim 1, wherein the securement member is configured to selectively force the restriction member and the swivel member toward the receiver to fix the orientation of the swivel member.

12. The adjustable nozzle assembly of claim 1, wherein engagement between the first planar portion and the second planar portion permits rotation of the swivel member relative to the restriction member about a third axis that intersects and is perpendicular to the first axis, and wherein the third axis is substantially perpendicular to the first planar portion and the second planar portion.

13. The adjustable nozzle assembly of claim 1, wherein engagement between the first planar portion and the second planar portion permits rotation of the swivel member relative to the restriction member about only a third axis that intersects and is perpendicular to the first axis.

14. The adjustable nozzle assembly of claim 1, wherein the swivel member has a substantially spherical external surface portion positioned opposite the first planar portion.

15. The adjustable nozzle assembly of claim 1, wherein the first planar portion is configured to engage the second planar portion to limit rotation of the swivel member relative to the restriction member such that the swivel member is rotatable relative to the receiver about the first axis only when the restriction member rotates about the first axis, and wherein the swivel member is rotatable relative to the receiver about a third axis that intersects and is perpendicular to the first axis.

16. An adjustable nozzle assembly comprising:
    a receiver having a first inlet, a first outlet, and a first internal passageway extending between the first inlet and the first outlet, the receiver including a reception chamber centered about a first axis, the reception chamber being in fluid communication with the first internal passageway;

a swivel member disposed in the reception chamber of the receiver, the swivel member having a second inlet fluidly coupled to the first outlet, a second outlet, and a second internal passageway extending between the second inlet and the second outlet;

a nozzle coupled to the swivel member and fluidly coupled to the second internal passageway, wherein the nozzle is centered about a second axis;

a restriction member having an internal surface including a first flat portion configured to engage a second flat portion of an external surface of the swivel member to limit rotation of the swivel member relative to the restriction member such that the swivel member is rotatable relative to the receiver about the first axis only when the restriction member rotates about the first axis, and wherein the swivel member is rotatable relative to the receiver through a range of motion about a third axis that intersects and is perpendicular to the first axis; and a securement member coupling the restriction member to the receiver, wherein the securement member is directly coupled to the receiver; and wherein the first internal passageway and the second internal passageway are in fluid communication internally throughout the entirety of the range of motion.

17. The adjustable nozzle assembly of claim 16, wherein the third axis is substantially perpendicular to the first flat portion and the second flat portion.

18. The adjustable nozzle assembly of claim 16, wherein the restriction member is formed as a single continuous piece.

19. An adjustable nozzle assembly comprising:

a receiver having a first inlet, a first outlet, and a first internal passageway extending between the first inlet and the first outlet, the receiver including a reception chamber centered about a first axis and having a first cross-sectional area, the reception chamber being in fluid communication with the first internal passageway;

a swivel member disposed in the reception chamber of the receiver, the swivel member having a second inlet fluidly coupled to the first outlet, a second outlet, and a second internal passageway extending between the second inlet and the second outlet, the second inlet having a second cross-sectional area;

a nozzle coupled to the swivel member and fluidly coupled to the second internal passageway, wherein the nozzle is centered about a second axis;

a restriction member formed as a single continuous piece having an internal surface including a first planar portion configured to engage a second planar portion of an external surface of the swivel member to limit rotation of the swivel member relative to the restriction member such that the swivel member is rotatable relative to the receiver about the first axis only when the restriction member rotates about the first axis, and wherein the swivel member is rotatable relative to the receiver about a third axis that intersects and is perpendicular to the first axis; and a securement member coupling the restriction member to the receiver, wherein the securement member is directly coupled to the receiver, and wherein the securement member is aligned with the first axis of the receiver;

wherein the first cross-sectional area is greater than the second cross-sectional area; and wherein a fluid can flow through the entirety of the first cross-sectional area and the entirety of the second cross-sectional area.

20. The adjustable nozzle assembly of claim 19, wherein the swivel member is rotatable relative to the restriction member through a range of motion, and wherein the entirety of the second cross-sectional area of the second inlet is in direct fluid communication with the reception chamber throughout the range of motion.

* * * * *